United States Patent
Chung et al.

(10) Patent No.: US 8,023,059 B2
(45) Date of Patent: Sep. 20, 2011

(54) ARRAY SUBSTRATE OF LIQUID CRYSTAL DISPLAY, METHOD OF REPAIRING SAME, AND LIQUID CRYSTAL DISPLAY

(75) Inventors: Te-Chen Chung, Kun Shan (CN); Tean-Sen Jen, Kun Shan (CN); Chia-Te Liao, Kun Shan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 408 days.

(21) Appl. No.: 12/057,398

(22) Filed: Mar. 28, 2008

(65) Prior Publication Data

US 2009/0167976 A1    Jul. 2, 2009

(30) Foreign Application Priority Data

Dec. 26, 2007    (CN) .......................... 2007 1 0305650

(51) Int. Cl.
*G02F 1/1333*    (2006.01)
*G02F 1/1343*    (2006.01)

(52) U.S. Cl. .......................................... 349/54; 349/55
(58) Field of Classification Search ............... 349/54–55
See application file for complete search history.

(56) References Cited

U.S. PATENT DOCUMENTS

| 6,111,558 A * | 8/2000 | Jeung et al. ..................... 345/93 |
| 2006/0146221 A1* | 7/2006 | Tabata et al. .................... 349/54 |
| 2007/0194348 A1* | 8/2007 | Yang et al. ..................... 257/202 |

FOREIGN PATENT DOCUMENTS

| CN | 101034513 A | 9/2007 |
| JP | 5333370 A | 12/1993 |

* cited by examiner

*Primary Examiner* — Nathanael R Briggs
(74) *Attorney, Agent, or Firm* — Perkins Coie LLP

(57) ABSTRACT

An array substrate of a liquid crystal display includes data lines; scanning lines configured to cross with the data lines; a test line provided outside a display region of the array substrate for test of the array substrate; and a repair line provided outside the display region for repair of a defective data line. The test line is configured to be electrically isolated from the repair line when the repair is not carried out and is electrically connected to the repair line and the defective data line when the repair is performed. A method of repairing the array substrate and a liquid crystal display using the array substrate are also provided. According to the invention, the test line can be used as a part of a repair circuit for repair of the data lines, thereby greatly decreasing non-display area.

20 Claims, 5 Drawing Sheets

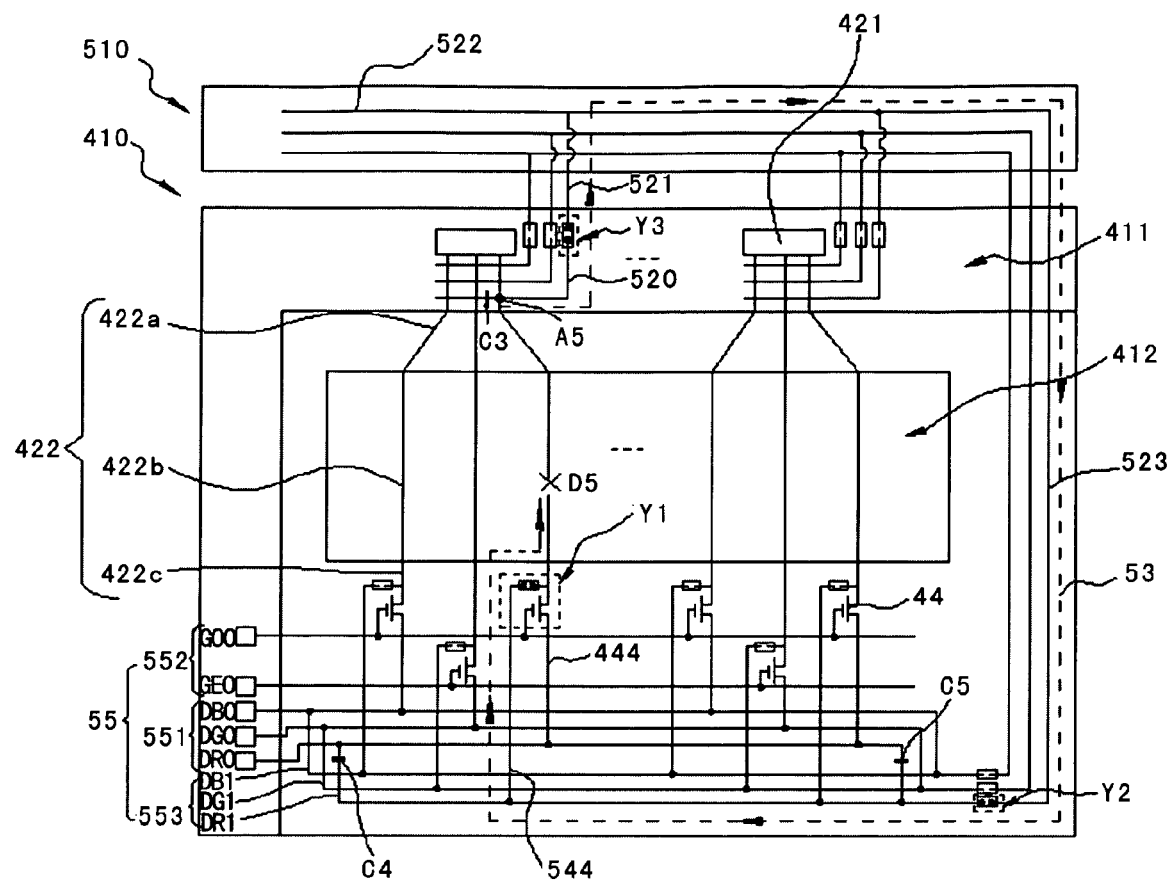
F I G. 3A
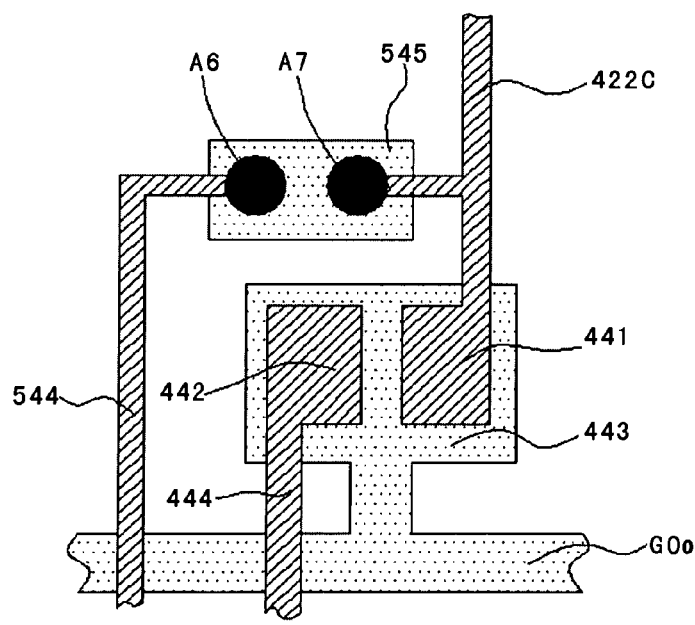
F I G. 3B

ARRAY SUBSTRATE OF LIQUID CRYSTAL DISPLAY, METHOD OF REPAIRING SAME, AND LIQUID CRYSTAL DISPLAY

FIELD OF THE INVENTION

The present invention relates to an array substrate of a liquid crystal display (LCD) and a method of repairing the same, and in particular to an array substrate of a liquid crystal display having a repair line structure and a method of repairing the same, as well as a liquid crystal display having the array substrate.

BACKGROUND

Liquid crystal displays are advantageous in being light, thin and low power consumption, and have been widely used in modern information devices such as notebook computers, mobile phones, and personal digital assistants (PDAs).

FIG. 1 shows an array substrate of a conventional liquid crystal display. The LCD array substrate 110 comprises a signal introducing region 111 and a display region 112. Data line pads 121 and scanning line pads 131 are formed in the signal introducing region 111. A plurality of data lines 122 and scanning lines 132 are respectively connected to the data line pads 121 and the scanning line pads 131. A plurality of pixels P is defined in regions where the data lines and the scanning lines cross. External data signals and scanning signals are inputted via the data line pads 121 and the scanning line pads 131, and then transmitted to the respective pixels P in the display region 112 through the data lines 122 and the scanning lines 132.

In a conventional process for fabricating LCD array substrates, defects such as breakage and the like may occur in the data lines. As shown in FIG. 1, the data line 122 breaks at point D1 in the display region 112. In this case, data signals cannot be transmitted to the portion of data line below the break point D1, thereby causing a line defect.

SUMMARY

The present invention provides an array substrate of a liquid crystal display, comprising: data lines; scanning lines configured to cross with the data lines; a test line provided outside a display region of the array substrate for test of the array substrate; and a repair line provided outside the display region for repair of a defective data line. The test line is electrically isolated from the repair line when the repair is not carried out and is electrically connected to the repair line and the defective data line when the repair is performed.

The present invention also provides a method for repairing a line defect in an array substrate of a liquid crystal display. The array substrate comprises data lines; scanning lines configured to cross with the data lines; a test line provided outside a display region of the array substrate for test of the array substrate; and a repair line provided outside the display region for repair a defective data line. The test line and the repair line are electrically isolated from each other. The method comprises electrically connecting the test line with the repair line and the defective data line.

The present invention further provides a liquid crystal display comprising an array substrate and a printed circuit board, wherein the array substrate comprises: data lines; scanning lines configured to cross the data lines; a test line provided outside a display region of the array substrate for test of the array substrate; and a repair line provided outside the display region for repair a defective data line. The test line is electrically isolated from the repair line when the repair is not carried out and is electrically connected to the repair line and the defective data line when the repair is carried out.

According to an embodiment of the invention, the test line can be used as a part of the repair line, thereby realizing the repair of the defective data line. Furthermore, the non-display area of the array substrate is substantially decreased because it is not necessary to arrange the test line separately. In addition, the test line and the repair line are not in an electrical connection when the repair is not carried out, thus normal operation of the test line will not be affected when the repair is not carried out.

According to another embodiment of the invention, auxiliary test data lines may be connected in parallel to the corresponding test data lines. As a result, the resistance of the test data line is substantially decreased and the influence of signal delay is thus lowered. In addition, repairing a data line with the auxiliary test data line prevents parasitic capacitance from occurring, and allows repair of a defect of the test data line itself, such as short circuit or open circuit.

DESCRIPTION OF THE DRAWINGS

FIG. 3A is a view showing a repair line structure of an array substrate of a liquid crystal display in accordance with a second embodiment of the invention.

FIG. 3B is a detailed view of TFT in the region Y1 of FIG. 3A.

DETAILED DESCRIPTION OF THE INVENTION

Exemplary embodiments will be described in detail in the following with reference to the drawings.

Figure 1:
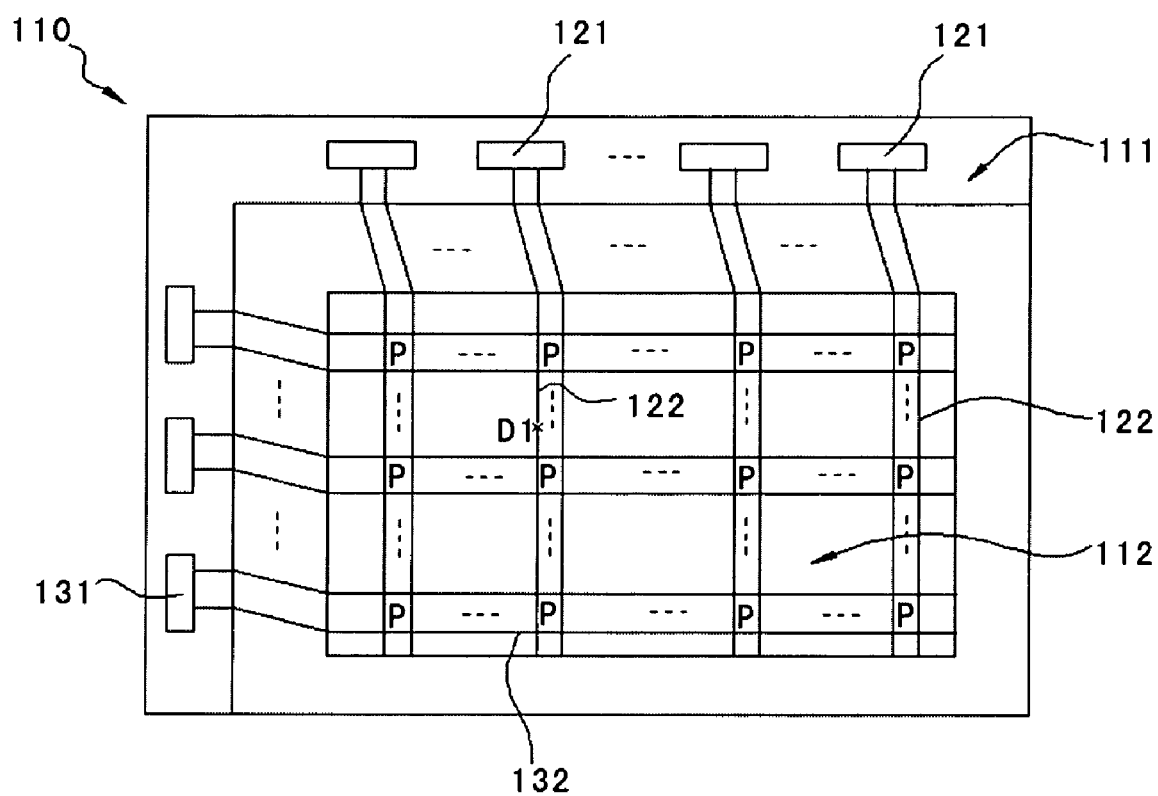
FIG. 1 is a view showing an array substrate of a conventional liquid crystal display.
Figure 2A:
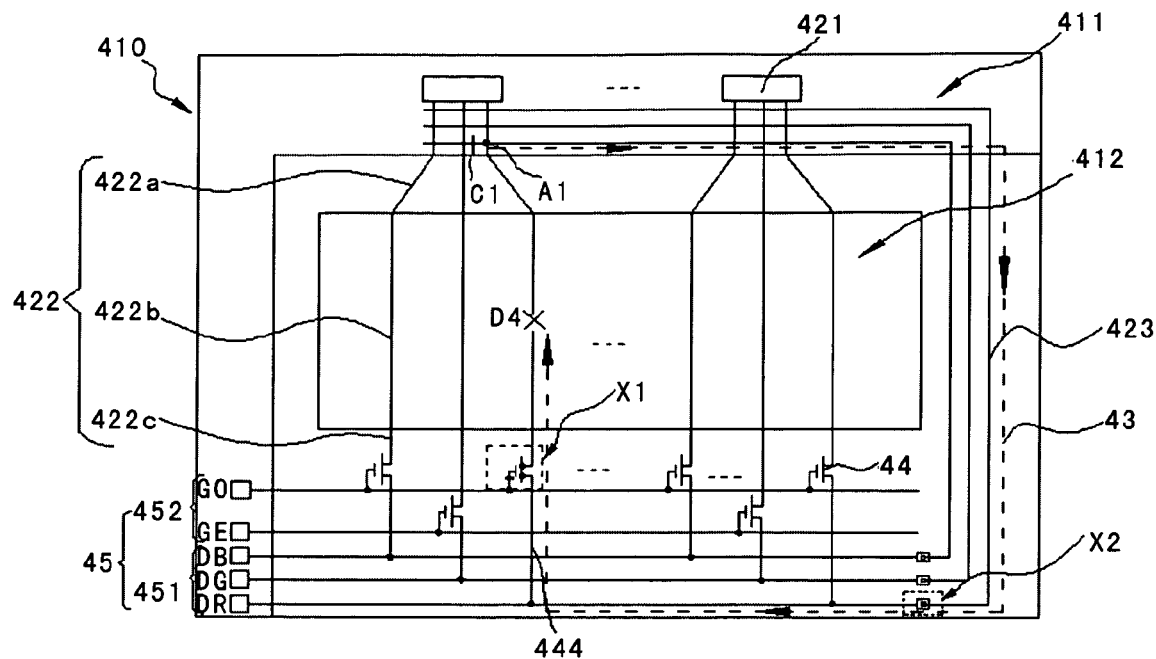
FIG. 2A is a view showing a repair line structure of an array substrate of a liquid crystal display in accordance with a first embodiment of the invention.

FIG. 2A is a plan view showing a repair line structure of an array substrate of a liquid crystal display (LCD) in accordance with a first embodiment of the invention. The LCD array substrate 410 comprises a display region 412 and a signal introducing region 411 outside the display region 412. A plurality of data line pads 421 is formed in the signal introducing region 411 and electrically connected with corresponding data lines 422 respectively. Each of the data lines 422 comprises three portions, that is, a front data line portion 422a outside the display region 412 and electrically connected with a corresponding data line pad 421, a display region data line portion 422b in the display region 412, and an end data line portion 422c outside the display region 412 and at the side away from the data line pad 421. Data signals inputted from the data line pad 421 are transmitted on the whole data line 422 in an order of the front data line portion 422a, the display region data line portion 422b and the end data line portion 422c. For the sake of clarity, scanning lines, which are provided crossing with the data lines 422, and scanning line pads are not shown in FIG. 2A.

A repair line 423 is positioned outside the display region 412. As shown in FIG. 2A, the repair line 423 is positioned on the upper and right sides of the display region 412, but does not fully extend to the lower side of the display region. As shown in the plan view of FIG. 2A, the repair line 423 crosses with the front data line portion 422a at a location A1 when viewed along a direction perpendicular to the surface of the array substrate 410. Along the direction perpendicular to the surface of the array substrate 410, the repair line 423 and the front data line portion 422a are positioned in different layers separated by an insulating layer therebetween. Hence the repair line 423 and the front data line portion 422a are normally not in an electrical connection. Although in the plan view of FIG. 2A, the repair line 423 and the front data line portion 422a are arranged perpendicularly, the invention is by no means limited to such a perpendicularly arranged manner. It is sufficient as long as there is a crossing point between them in the plan view.

As shown in FIG. 2A, test lines 45 are also provided outside the display region 412, and in the embodiment are positioned below the display region 412. The test lines 45 comprise test data lines 451 and test scanning lines 452. The test data lines 451 for transmitting test data signals comprise three test data lines DB, DG and DR for transmitting test data signals with respect to blue (B), green (G) and red (R) respectively. The test scanning lines 452 for transmitting test scanning signals comprise two test scanning lines GO and GE for transmitting test scanning signals with respect to the odd and even columns respectively. The test lines 45 transmit test signals to the data lines 422 via TFTs 44.

In the embodiment shown in FIG. 2A, the test lines 45 and the TFTs 44 are connected in the following manner. Gate electrodes of TFTs 44 in the odd and even columns counted from the left are respectively connected to the GO and GE lines of the test scanning lines 452, and source electrodes of TFTs 44 in the 3n-2, 3n-1 and 3 n (n=1, 2, 3 . . . ) columns counted from the left are respectively connected to the DB, DG and DR lines of the test data lines 451. It is noted that the connecting technique of FIG. 2A is merely an example, and it is possible to have other techniques, for example, providing only one test scanning line, or providing more test data lines, etc. In an embodiment, the test lines 45 and the repair line 423 may be arranged partly or entirely in a perimeter seal region so as to reduce the non-display area in the liquid crystal display panel. Here, the perimeter seal region is such a region in the array substrate that will be adhered to a color filter substrate so as to form a liquid crystal display.

Figure 2B:
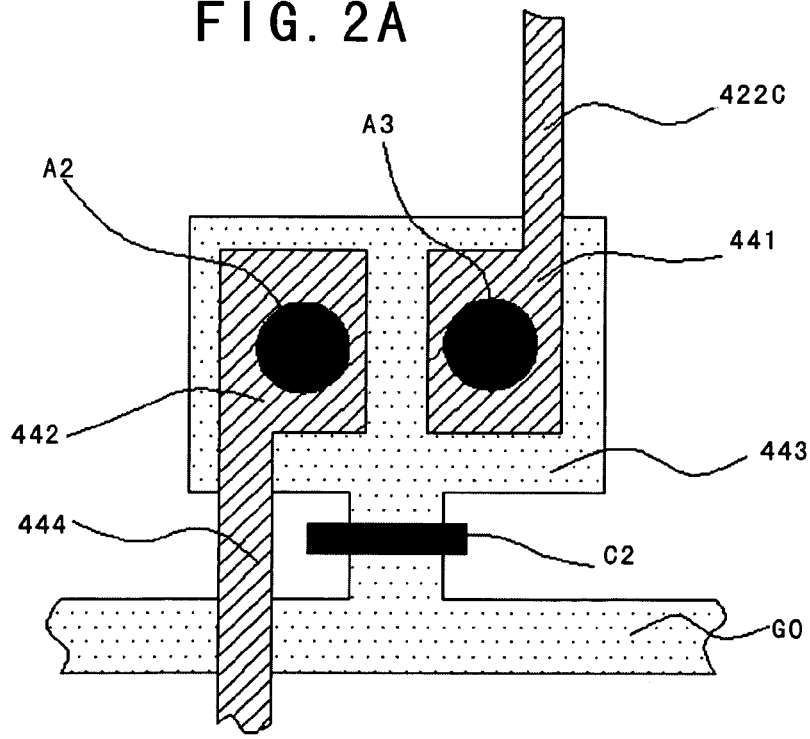
FIG. 2B is a detailed view of TFT in the region X1 of FIG. 2A.

FIG. 2B shows a detailed view showing the TFT 44 in the region X1 of FIG. 2A. The TFT 44 has a source electrode 442, a drain electrode 441 and a gate electrode 443. The source electrode 442 is connected to a test data line branch 444, the drain electrode 441 is connected to the end data line portion 422c of corresponding data line 422, and the gate electrode 443 is connected to one of the test scanning lines 452 (in particular, to the GO line of the test scanning lines 452 in FIG. 2A). The test data line branch 444 is connected to one of the test data lines 451 (in particular, to the DR line of the test data lines 451 in FIG. 2A).

Figure 2C:
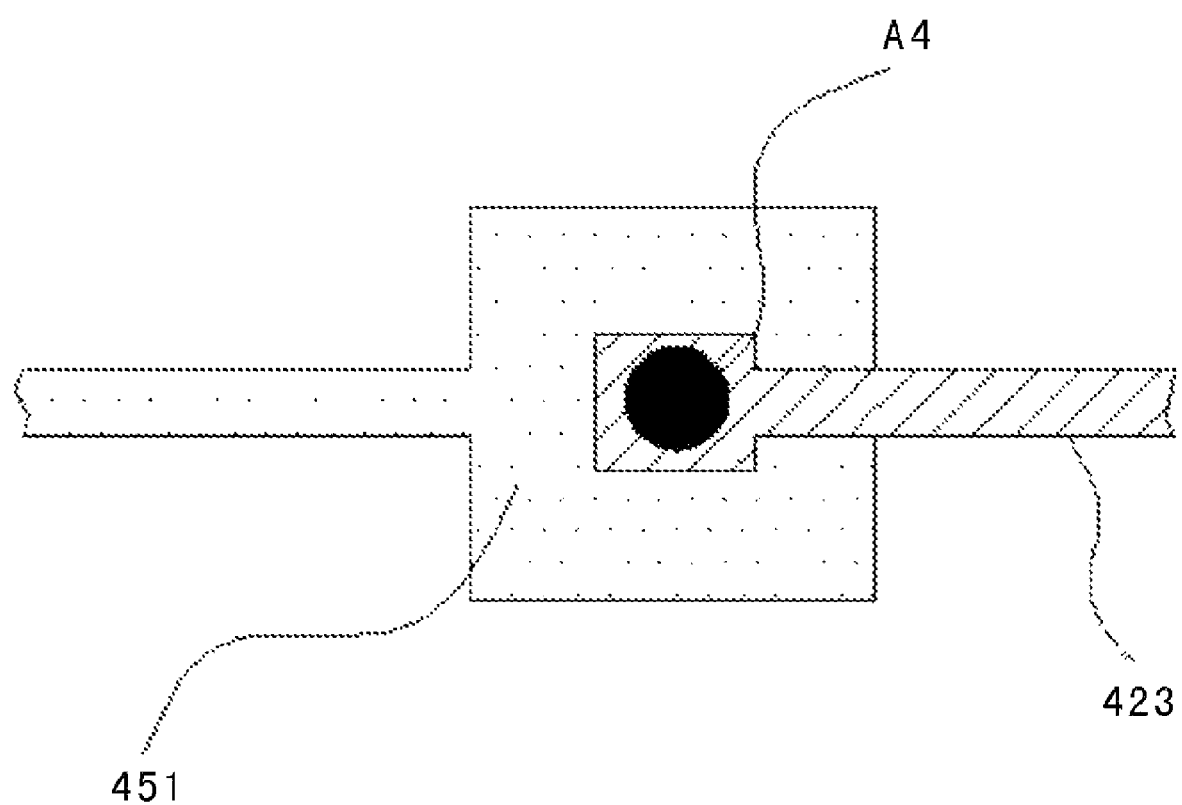
FIG. 2C is a detailed view of the region X2 of FIG. 2A.

FIG. 2C is a detailed view showing the test data line 451 and the repair line 423 in the region X2 of FIG. 2A. When viewed along a direction perpendicular to the surface of the array substrate, as shown in FIG. 2C, the test data line 451 (in particular, the DR line of the test data lines 451 in FIG. 2A) at least partly overlaps with an end of the repair line 423; that is, an overlapping region exists between them. However, in the direction perpendicular to the surface of the array substrate, the test data line 451 and the repair line 423 are positioned in different layers which are separated by an insulating layer therebetween. Therefore, the test data line 451 and the repair line 423 are in an insulated state when repair is not carried out.

With reference to FIGS. 4A-4C, a method for repairing a defective data line of the array substrate 410 of the liquid crystal display in accordance with the first embodiment of the invention will be described as follows. For example, in case of a break defect occurring at a point D4 of the defective data line 422 as shown in FIG. 2A, the method may comprise:

(1) Electrically connecting the repair line 423 with the front data line portion 422a of the defective data line 422. For example, the repair line 423 may be electrically connected with the front data line portion 422a of the data line 422 at the crossing point A1 by laser melting.

(2) Electrically connecting the test data line 451 with the repair line 423. For example, an end of the test data line 451 (in particular, the DR line of the test data line 451 in FIG. 2A) may be electrically connected with an end of the repair line 423 at the crossing point A4 by laser melting, as shown in FIG. 2C.

(3) Processing the TFT 44 to electrically connect the source electrodes 442 and the drain electrodes 441 and cut off the electrical connection between the gate line 443 and the test scanning line 452. For example, for the TFT 44 in the region X1 of FIG. 2A, as shown in FIG. 2B, the source electrode 442 and the drain electrode 441 are electrically connected with the gate electrode 443 at the respective crossing points A2 and A3 by laser melting, and the electrical connection between the gate electrode 443 and the test scanning line 452 is cut off at the point C2 by, for example, laser. Thus the gate electrode 443 becomes an isolated island structure and is no longer electrically connected with the test scanning line 452. As a result, data signals transmitted from the test data line branch 444 to the gate electrode 443 (repaired data signal) will not be transmitted to the test scanning line 452 to affect normal operation of the display.

With the above repairing technique, data signals on the defective data line 422 can be transmitted, along a path shown by the dashed line 43 of FIG. 2A, to the portion of this data line 422 below the break point D4. The specific transmitting path is: from the front data line portion 422a to the repair line 423 via the crossing point A1, then to the test data line 451 (in particular, the DR line) via the crossing point A4, then to the source electrode 442 of the TFT 44 via the test data line branch 444 connected with the test data line 451, then to the gate electrode 443 via the overlapping region A2, then to the drain electrode 441 via the overlapping region A3 and to the end data line portion 442c connected with the drain electrode 441 via the drain electrode 441, and finally to the portion of the display region data line portion 442b below the break point D4.

With the point A1 at which the repair line 423 and the front data line portion 422a crosses as a boundary, the repair line 423 can be divided into two portions; that is, a first portion through which data signals are transmitted to the defective data line 422 (for example, the portion to the right of the crossing point A1 in FIG. 2A) and a second portion through which data signals do not pass when data signals are transmitted to the defective data line 422 (for example, the portion to the left of the crossing point A1 in FIG. 2A) in case that the above repair is carried out. In an embodiment, the repair line 423 may be cut off at any position in the above second portion. In a further embodiment, the cut off position may be adjacent to the crossing point A1. In this manner, the parasitic capacitance between the repair line 423 and the front data line portions 422a in which no break defect occurs may be reduced, thereby improving signal quality.

In accordance with the first embodiment of the invention, the test lines 45 are provided outside the display region 412 of the array substrate 410 and used for test of the array substrate

410. The repair line 423 is provided outside the display region 412 and used for repairing a defective data line 422.

In accordance with the first embodiment of the invention, no separate repair line is provided below the display region 412; rather, the test lines 45 are utilized as a part of the repaired signal transmission path to achieve repair of a defective data line 422. As a result, the non-display area of the array substrate 410 is substantially decreased, and the utilized efficiency of the panel is increased. In addition, the test lines 45 and the repair line 423 are not in an electrical connection when repair is not carried out by the repair line 423, thus normal operation of the test lines 45 will not be affected. It should be noted that the test lines 45 and the repair line 423 in the first embodiment is merely illustrative instead of restrictive.

With reference to FIGS. 5A-5D, a second embodiment of the invention will be described as follows. In the second embodiment, parts that are identical or similar to those in the first embodiment are indicated with identical or similar labels, and will not be described redundantly.

FIG. 3A is a plan view showing a repair line structure of an array substrate of liquid crystal display in accordance with a second embodiment of the invention. Similar to FIG. 2A, the array substrate 410 of the liquid crystal display comprises a display region 412 and a signal introducing region 411 outside the display region 412. A plurality of data line pads 421 are formed in the signal introducing region 411 and electrically connected with the data lines 422. Each data line 422 comprises three portions, that is, a front data line portion 422*a* outside the display region 412 and connected with a corresponding data line pad 421, a display region data line portion 422*b*, and an end data line portion 422*c* outside the display region 412 and at the side away from the data line pad 421. Data signals inputted from the data line pad 421 are transmitted on the whole data line 422 in an order of the front data line portion 422*a*, the display region data line portion 422*b* and the end data line portion 422*c*. For the sake of clarity, scanning lines crossing with the data lines 422, and scanning line pads are not shown in FIG. 3A.

The repair line comprises a data connection line 520, a connection element 547 (see FIG. 3D), a repair connection line 521, a common repair line 522 on a printed circuit board (PCB) 510, and a data repair line 523 outside the display region 412. The data repair line 523 extends at the right side of the display region 412 and does not fully extend to the lower side of the display region 412. In order to facilitate the description, the connecting technique between the common repair line 522 on the PCB 510 and the data repair line 523 on the array substrate 410 will not be described in detail. However, it is apparent to those skilled in the art that connection techniques such as Chip On Film (COF) and Tape Carrier Package (TCP) and the like may be used. The data connection line 520 crosses with the front data line portion 422*a* when viewed along a direction perpendicular to the surface of the array substrate 410; however, the data connection line 520 and the front data line portion 422*a* are positioned in different layers in the direction perpendicular to the surface of the array substrate 410 and are separated by an insulating layer therebetween. Thus the data connection line 520 and the front data line portion 422*a* are not in an electrical connection when repair is not carried out with the repair line. Although in the plan view of FIG. 3A, the data connection line 520 and the front data line portion 422*a* are arranged perpendicularly, the invention is by no means limited to such a perpendicularly arranged manner. It is sufficient as long as there is a crossing point between them in the plan view.

As shown in FIG. 3A, test lines 55 are provided outside the display region 412, and comprise test data lines 551, test scanning lines 552 and auxiliary test data lines 553. The test data lines 551 are used to transmit test data signals and include three test data lines $DB_0$, $DG_0$ and $DR_0$. The test scanning lines 552 are used to transmit test scanning signals and include two test scanning lines $GO_0$ and $GE_0$. The auxiliary test data lines 553 include three lines $DB_1$, $DG_1$ and $DR_1$. As shown in FIG. 3A, the two ends of the test data line $DB_0$ and the two ends of the auxiliary test data line $DB_1$ are connected respectively. Similarly, the two ends of the test data line $DG_0$ and the two ends of the auxiliary test data line $DG_1$, and the two ends of the test data line $DR_0$ and the two ends of the auxiliary test data line $DR_1$, are also connected respectively. That is, the auxiliary test data lines $DB_1$, $DG_1$ and $DR_1$ are in parallel with the corresponding test data lines $DB_0$, $DG_0$ and $DR_0$ respectively. Data test signals are transmitted to the data lines 422 via the TFTs 44 from the test lines 55.

As shown in FIG. 3A, in order to carry out tests more effectively, the test lines 55 and the TFTs 44 are connected such that the gate electrodes of the TFTs in the odd and even columns counted from the left are respectively connected to the $GO_0$ and $GE_0$ lines of the test scanning lines 552, and the source electrodes of TFTs in the 3n-2, 3n-1 and 3n (n=1, 2, 3 ...) columns counted from the left are respectively connected to the $DB_0$, $DG_0$ and $DR_0$ lines of the test data lines 551. It is noted that that the connecting technique in FIG. 3A is merely an example, and it is possible to use other techniques, for example, providing only one test scanning line, or providing more test data lines, etc. In an embodiment, the test lines 55 and the data repair line 523 may be arranged partly or entirely in a perimeter seal region so as to reduce the non-display area in the liquid crystal display panel.

FIG. 3B shows a detailed view of the region Y1 of FIG. 3A, which mainly discloses a TFT 44 and a connecting element 545 made of conductor. The TFT 44 has a source electrode 442, a drain electrode 441 and a gate electrode 443. The source electrode 442 is connected to the test data line branch 444, the drain electrode 441 is connected to the end data line portion 422*c* of the corresponding data line 422, and the gate electrode 443 is connected to the test scanning line 552 (in particular, to the $GO_0$ line of the test scanning line 552 in FIG. 3A). The test data line branch 444 is connected to one of the test data lines 551 (in particular, to the $DR_0$ line of the test data lines 551 in FIG. 3A). In addition, when viewed along a direction perpendicular to the surface of the array substrate, an overlapping region exists at a point A6 between a auxiliary test data line branch 544 and the connecting element 545 which are positioned in different layers in the direction and are separated by an insulating layer therebetween; an overlapping region exists at a point A7 between the end data line portion 422*c* and the connecting element 545 which are positioned in different layers in the direction and are separated by an insulating layer therebetween. The auxiliary test data line branch 544 is connected to one of the auxiliary test data lines 553 (in particular to the line $DR_1$ of the auxiliary test data lines 553). When repair is not carried out using the repair line, any two among the auxiliary test data line branch 544, the connecting element 545 and the end data line portion 422*c* are not electrically connected.

Figure 3C:
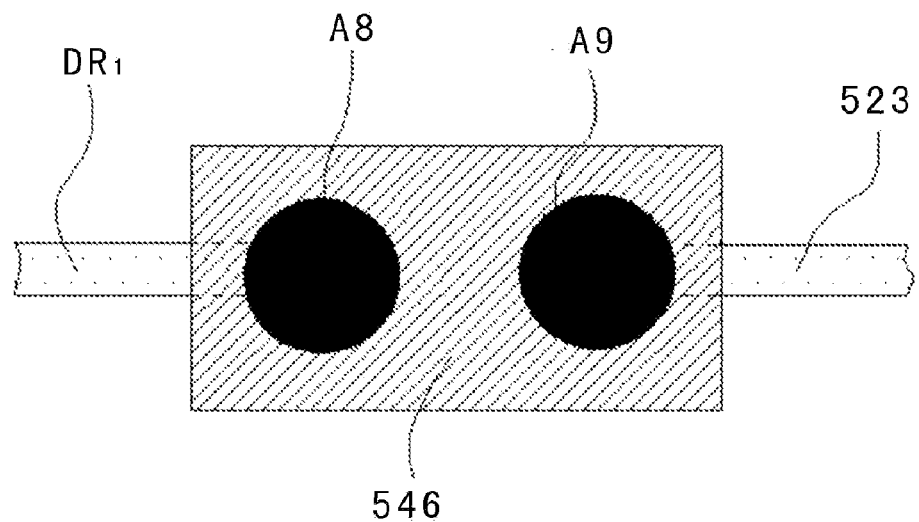
FIG. 3C is a detailed view of the region Y2 of FIG. 3A.

FIG. 3C is a detailed view showing the region Y2 of FIG. 3A. When viewed along a direction perpendicular to the surface of the array substrate 410, as shown in FIG. 3C, an overlapping region exists at a point A8 between the test data auxiliary line 553 (in particular, the DR1 line in the test data auxiliary lines 553 in FIG. 3A) and a connecting element 546 made of conductor which are positioned in different layers in the direction and are separated by an insulating layer therebetween. Also, when viewed along a direction perpendicular to the surface of the array substrate 410, an overlapping region exists at a point A9 between the data repair line 523 and the connecting element 546 which are positioned in different layers in the direction and are separated by an insulating layer therebetween. Therefore, when repair is not carried out using the repair line, any two among the auxiliary test data line 553, the connecting element 546 and the data repair line 523 are not electrically connected.

Figure 3D:
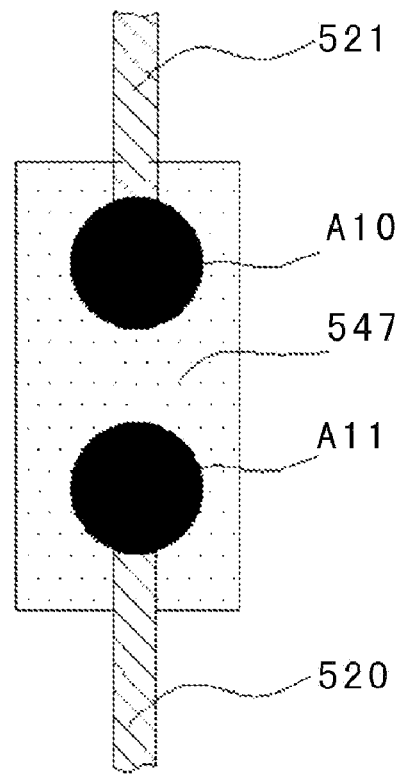
FIG. 3D is a detailed view of the region Y3 of FIG. 3A.

FIG. 3D is an enlarged view of the region Y3 of FIG. 3A. When viewed along a direction perpendicular to the surface of the array substrate 410, as shown in FIG. 3D, an overlapping region exists at a point A11 between the data connection line 520 and a connecting element 547 made of conductor which are positioned in different layers in the direction and are separated by an insulating layer therebetween. Also, when viewed along a direction perpendicular to the surface of the array substrate 410, an overlapping region exists at a point A10 between the repair connection line 521 and the connecting element 547 which are positioned in different layers in the direction and are separated by an insulating layer therebetween. Therefore, when repair is not carried out using the repair line, any two among the data connection line 520, the connecting element 547 and the repair connection line 521 are not electrically connected.

With reference to FIGS. 5A-5D, a method for repairing a defective data line of the array substrate 410 of the liquid crystal display in accordance with the second embodiment of the invention will be described as follows. For example, in case of a break defect occurring at a point D5 of the defective data line 422 as shown in FIG. 3A, the method may comprise:

(1) Electrically connecting the data connection line 520 with the front data line portion 422a of the defective data line 422. For example, the data connection line 520 may be electrically connected with the front data line portion 422a of the data line 422 at the crossing point A5 by laser melting.

(2) Electrically connecting the data connection line 520 with the repair connection line 521. For example, the data connection line 520 may be electrically connected with the connection element 547 at the crossing point A11 and the repair connection line 521 may be electrically connected with the connection element 547 at the crossing point A10 by laser melting, as shown in FIG. 3D.

(3) Electrically connecting the test data line 551 with the data repair line 523. For example, the auxiliary test data line 553 (in particular, the $DR_1$ line in FIG. 3A) may be electrically connected with the connection element 546 at the crossing point A8 and the data repair line 523 may be electrically connected with the connection element 546 at the crossing point A9 by laser melting, as shown in FIG. 3C.

(4) electrically connecting the auxiliary test data line branch 544 corresponding to the defective data line 422 with the end data line portion 422c of the data line 422, and cutting off the connection between the test data auxiliary line 553 (in particular, the $DR_1$ line in FIG. 3A) used for repair and the corresponding test data line 551 (in particular, the $DR_0$ line in FIG. 3A). As shown in FIG. 3A, when the $DR_1$ line of the auxiliary test data lines 553 is used as a repair line, the auxiliary test data line branch 544 may be electrically connected with the connection element 545 at the crossing point A6 and the end data line portion 422c may be electrically connected with the connection element 545 at the crossing point A7, for example, by laser melting (see FIG. 3B), while the connection between the $DR_1$ line and the $DR_0$ line may be cut off at points C4 and C5, for example, by laser.

With the above repair technique, data signals on the defective data line 422 can be transmitted, along a path shown by the dashed line 53, to the portion of this data line 422 below the break point D5. The specific transmitting path is: from the front data line portion 422a to the data connection line 520 via the crossing point A5, then to the connection element 547 via the crossing point A11, then to the repair connection line 521 via the crossing point A10, then to the data repair line 523 via the common repair line 522 on the PCB, then to the connection element 546 via the crossing point A9, then to the $DR_1$ line of the auxiliary test data lines 553 and to the auxiliary test data line branch 544 via the crossing point A8, and to the connection element 545 via the crossing point A6, to the end data line portion 422c via the crossing point A7, and finally to the portion of the display region data line portion 442b below the break point D5.

Similar to the first embodiment, with the point A5 at which the data connection line 520 and the front data line portion 422a crosses as a boundary, the repair line can be divided into two portions; that is, a first portion through which data signals are transmitted to the defective data line 422 (for example, the portion to the right of the crossing point A5 in FIG. 3A) and a second portion through which data signals do not pass when data signals are transmitted to the defective data line 422 (for example, the portion to the left of the crossing point A5 in FIG. 3A) in case that the above repair is carried out. In an embodiment, the data connection line 520 may be cut off at any position in the above second portion. In a further embodiment, the cut off position may be adjacent to the crossing point A5. For example, in FIG. 3A, it is possible to cut off the data connection 520 at a point C3 by laser. In this manner, the parasitic capacitance between the repair line and the front data line portions in which no break defect occurs may be reduced.

In accordance with the second embodiment of the invention, the test lines 55 are provided outside the display region 412 of the array substrate 410 and used for test of the array substrate 410; the repair line comprising the data connection line 520, the connection element 547, the repair connection line 521, the common repair line 522 and the data repair line 523 is provided outside the display region 412 and used for repairing a defective data line 422.

In accordance with the second embodiment of the invention, no separate repair line is provided below the display region 412; rather, the test lines 55 are utilized as a part of the repaired signal transmission path to achieve repair of a defective data line. As a result, the non-display area is substantially decreased. In addition, the auxiliary test data line 553 and the test data line 551 are connected in parallel. As a result, the resistance of the test data line is substantially decreased and the influence of signal delay is thus lowered. Furthermore, a part of the repair line (for example the above common repair line 522) that the transmitting data signals passes can be arranged on a PCB external to the array substrate, and materials having low resistivity (such as copper or the like) may be used. The resistance of the whole path through which data signals transmit, and accordingly the signal delay, can be further decreased.

Furthermore, when repair is carried out on a defective data line 422, the data signals transmitted through the auxiliary test data line 553 can not be transmitted to source electrodes of the TFTs 44 that are not used in the repair. As a result, no parasitic capacitance occurs between these source electrodes and the corresponding gate electrodes of the TFTs, and the transmission of the data signals will not be affected. Moreover, the repair line structure in accordance with the second embodiment of the invention can be used to repair a defect of the test data line itself, such as short circuit or open circuit.

The test lines 55 and the data repair line 523 are not in an electrical connection when repair is not carried out, thus normal operation of the test lines 55 will not be affected. It should be noted that the test lines and the repair line of the second embodiment are merely illustrative instead of restrictive in terms of structures and connecting techniques.

It will be apparent to those skilled in the art that many modifications or alternatives may occur to the above embodiments.

For example, in the second embodiment, the common repair line 522 may be provided on the array substrate instead of on a separate PCB; the auxiliary test data line 533, the data repair line 523 and the like may be provided on a PCB instead of on the array substrate, etc.

Alternatively, for the second embodiment, it is also possible to connect directly the auxiliary test data line 553 and the data repair line 523 without providing the connection element 546, and accordingly omit the above process (3) in the second embodiment when repair is carried out. In this case, the data repair line 523 is in effect a portion of the auxiliary test data line 553. In this modification, the test line comprises the repair connection line 521, the common repair line 522 and the data repair line 523, in addition to the test data line 551, the test scanning line 552 and the auxiliary test data line 553 which are used to carry out test on the array substrate. The repair line comprises the data connection line 520. In this modification, the shift between the states of electrical isolation and electrical connection is achieved by the connection element 547.

Although the above is directed to repair of a defect in the data line, the present invention is also applicable to repair of a defect in the scanning line. The terms "above", "below", "left" and "right" here are used with respect to the specific embodiment described herein, and it is apparent for those skilled in the art that these positional relations can vary depending on the circumstances. In the method for repairing a line defect in accordance with the invention, the order of the steps are not subject to specific limitations and may be configured depending on processing or economic factors. A plurality of steps in the method may be completed simultaneously, or one of the steps therein may be completed in several procedures of different timing. Therefore, the invention is not limited by the specific embodiments described above, but only by the appended claims.

What is claimed is:

1. An array substrate of a liquid crystal display, comprising:
   data lines, each data line comprises a front data line portion, a display region data line portion and an end data line portion;
   scanning lines configured to cross with the data lines;
   a test line provided outside a display region of the array substrate for test of the array substrate; and
   a repair line provided outside the display region for repair of a defective data line,
      wherein the test line is configured to be electrically isolated from the repair line when the repair is not carried out and is configured to be electrically connected to the repair line and the defective data line when the repair is carried out.

2. The array substrate of claim 1, wherein the test line comprises a test data line for transmitting a test data signal and a test scanning line for transmitting a test scanning signal, and wherein the test data line is configured to be electrically connected to the repair line and the defective data line when the repair is carried out.

3. The array substrate of claim 1, wherein
   the test line comprises a test data line for transmitting a test data signal, a test scanning line for transmitting a test scanning signal, and an auxiliary test data line connected in parallel with the test data line, and
   wherein when the repair is carried out, the auxiliary test data line is configured to be electrically isolated from the test data line and to be electrically connected to the repair line and the defective data line.

4. The array substrate of claim 1, wherein
   the repair line is positioned at least partially on a printed circuit board external to the array substrate.

5. The array substrate of claim 1, wherein
   the test line is positioned at least partially in a perimeter seal region of the array substrate.

6. The array substrate of claim 1, wherein
   the repair line is positioned at least partially in a perimeter seal region of the array substrate.

7. The array substrate of claim 1, wherein
   in a direction perpendicular to a surface of the array substrate, the test line and the repair line overlap with each other, and are separated by an insulating layer therebetween.

8. The array substrate of claim 1, further comprises a connection element made of conductor,
   wherein in a direction perpendicular to a surface of the array substrate, both the test line and the repair line overlap with the connection element; and
   wherein the test line and the connection element are separated by an insulating layer therebetween, and the repair line and the connection element are separated by an insulating layer therebetween.

9. The array substrate of claim 2, further comprises thin film transistors corresponding to the data lines,
   wherein each of the thin film transistors has a source electrode electrically connected to the test data line, a drain electrode electrically connected to the data line, and a gate electrode electrically connected to the test scanning line; and
   wherein when the repair is carried out, the source electrode and the drain electrode of the thin film transistor corresponding to the defective data line are electrically connected, and an electrical connection between the gate electrode of the thin film transistor and the test scanning line is cut off.

10. The array substrate of claim 1, wherein
   the repair line is configured to be electrically isolated from the front data line portion when the repair line is not used to carry out repair, and is configured to be electrically connected with the front data line portion when the repair line is used to carry out repair.

11. The array substrate of claim 10, wherein
   the test line is configured to be electrically connected with the end data line portion of the defective data line when the repair is carried out.

12. A method for repairing an array substrate of a liquid crystal display, the array substrate comprising
   data lines, each data line comprises a front data line portion, a display region data line portion and an end data line portion;
   scanning lines configured to cross with the data lines;
   a test line provided outside a display region of the array substrate for test of the array substrate; and
   a repair line provided outside the display region for repair of a defective data line,
      the test line and the repair line being electrically isolated from each other, wherein the method comprises electrically connecting the test line with the repair line and the defective data line.

13. The method of claim 12, wherein the test line comprises a test data line for transmitting a test data signal and a test scanning line for transmitting a test scanning signal, and wherein the process of electrically connecting comprises electrically connecting the test data line of the test line with the repair line and the defective data line.

14. The method of claim 13, wherein the test line further comprises an auxiliary test data line connected in parallel with the test data line, and wherein the process of electrically connecting comprises electrically isolating the auxiliary test data line from the test data line and electrically connecting the auxiliary test data line with the repair line and the defective data line.

15. The method of claim 13, wherein
the array substrate further comprises thin film transistors corresponding to the data lines, each thin film transistor having a source electrode electrically connected to the test data line, a drain electrode electrically connected to the data line, and a gate electrode electrically connected to the test scanning line; and
wherein the process of electrically connecting the test data line with the repair line and the defective data line comprises electrically connecting the source electrode and the drain electrode of the thin film transistor corresponding to the defective data line, and cutting off the electrical connection between the gate electrode of the thin film transistor and the test scanning line.

16. The method of claim 12, wherein the repair line comprises a first portion and a second portion, wherein a data signal can be transmitted to the defective data line through the first portion but not through the second portion when the repair is carried out, and
wherein the method further comprises cutting off the repair line in the second portion.

17. A liquid crystal display comprising an array substrate and a printed circuit board, wherein the array substrate comprises:
data lines, each data line comprises a front data line portion, a display region data line portion and an end data line portion;
scanning lines configured to cross with the data lines;
a test line provided outside a display region of the array substrate for test of the array substrate; and
a repair line provided outside the display region for repair of a defective data line,
wherein the test line is configured to be electrically isolated from the repair line when the repair is not carried out and is configured to be electrically connected to the repair line and the defective data line when the repair is carried out.

18. The liquid crystal display of claim 17, wherein the test line comprises a test data line for transmitting a test data signal and a test scanning line for transmitting a test scanning signal, and wherein the test data line is configured to be electrically connected to the repair line and the defective data line when the repair is carried out.

19. The liquid crystal display of claim 18, wherein
the test line further comprises an auxiliary test data line connected in parallel with the test data line, and
wherein when the repair is carried out, the auxiliary test data line is configured to be electrically isolated from the test data line and to be electrically connected to the repair line and the defective data line.

20. The liquid crystal display of claim 17, wherein
the printed circuit board is provided with a common repair line thereon; and
wherein when the repair is carried out, the test line is electrically connected to the repair line via the common repair line on the printed circuit board.

* * * * *